(12) United States Patent
Searle et al.

(10) Patent No.: US 6,778,992 B1
(45) Date of Patent: Aug. 17, 2004

(54) FLEXIBLE AND HIERARCHICAL USER INTERFACES DEFINED USING A DATA DEFINITION LANGUAGE

(75) Inventors: Scott Searle, Kirkland, WA (US); David Simmons, Half Moon Bay, CA (US)

(73) Assignee: LockStream Corporation, Bellevue, WA (US)

( * ) Notice: Subject to any disclaimer, the term of this patent is extended or adjusted under 35 U.S.C. 154(b) by 0 days.

(21) Appl. No.: 09/468,722

(22) Filed: Dec. 21, 1999

(51) Int. Cl.$^7$ ................................................. G06F 17/30
(52) U.S. Cl. ........................ 707/101; 707/100; 707/103; 715/512; 715/513
(58) Field of Search ................................ 707/1, 2, 3, 101, 707/100, 103; 345/765, 516, 751, 762, 719, 716, 721, 733; 709/277; 715/512, 513; 717/165

(56) References Cited

U.S. PATENT DOCUMENTS

| | | | |
|---|---|---|---|
| 5,337,357 A | 8/1994 | Chou et al. | ................. 380/4 |
| 5,459,488 A | 10/1995 | Geiser | |
| 5,586,186 A | 12/1996 | Yuval et al. | ............... 380/30 |
| 5,619,731 A | 4/1997 | Jenkins et al. | |
| 5,694,381 A | 12/1997 | Sako | ....................... 369/58 |
| 5,889,860 A | 3/1999 | Eller et al. | ................. 380/4 |
| 5,905,797 A | 5/1999 | McRae | ........................ 380/3 |
| 5,933,497 A | 8/1999 | Beetcher et al. | ........... 380/4 |
| 5,995,457 A | 11/1999 | Jamail | |
| 6,005,935 A | 12/1999 | Civanlar | .................... 380/4 |
| 6,073,189 A | 6/2000 | Bounsall et al. | |
| 6,091,686 A | 7/2000 | Caffarelli | |
| 6,212,541 B1 | 4/2001 | McAuliffe | |
| 6,307,574 B1 * | 10/2001 | Ashe et al. | .............. 345/765 |
| 6,327,628 B1 * | 12/2001 | Anuff et al. | .............. 709/311 |
| 6,353,173 B1 | 3/2002 | D'Amato et al. | |
| 6,453,329 B1 * | 9/2002 | Dodgen | .................. 707/516 |
| 6,469,714 B2 * | 10/2002 | Buxton et al. | .............. 345/762 |
| 6,520,410 B2 * | 2/2003 | Putman et al. | .............. 235/380 |
| 6,573,907 B1 * | 6/2003 | Madrane | ................... 345/719 |
| 6,590,589 B1 * | 7/2003 | Sluiman et al. | ............ 345/751 |

FOREIGN PATENT DOCUMENTS

| | | |
|---|---|---|
| EP | 0 844 550 A | 5/1998 |
| JP | 07334916 | 4/1996 |
| JP | 10207808 A | 11/1998 |
| WO | WO 98/37483 | 8/1998 |

OTHER PUBLICATIONS

Extensible Markup Language (XML) 1.0, Feb. 10, 1998, REC–xml–19980210, http://www.w3.org/TR/1998REC–xml–19980210.

*The Format Frenzy In Digital Music*, http://www.washingtonpost.com/wp–srv/business/feed/a3191–1999oct1.htm, (Copyright dated 1999) (3 pages).

Bill Camarda, Special Edition Using Microsoft Word 97 (dated 1997).

Marc Abrams and Constantinos Phanouiou, "UIML: An XNL Language for Building Device–Independent User Interfaces" Proceedings of the XML '99 Conference (http://www.harmonia.com/resources/papers/xml199final.pdf).

* cited by examiner

Primary Examiner—Jean M. Corrielus
(74) Attorney, Agent, or Firm—Patrick J. S. Inouye

(57) ABSTRACT

A flexible and hierarchical user interface, defined using a data definition language, such as the extensible Markup Language (XML), is disclosed. In one embodiment, such an interface is defined by at least one file in the data definition language. A base file defines a basic look and behavior of the interface. The file also includes data, such as multimedia data, for access via the interface. One or more extension files modify the basic look and behavior of the interface as initially defined by the base file. In one particular embodiment, the interface includes a number of components organized into a number of layers. Each layer has a view state that is changeably selectable between visible and hidden.

22 Claims, 6 Drawing Sheets

FLEXIBLE AND HIERARCHICAL USER INTERFACES DEFINED USING A DATA DEFINITION LANGUAGE

This patent application is a continued examination application filed under 37 C.F.R 1.114.

FIELD OF THE INVENTION

This invention relates generally to user interfaces for computers and computerized devices, and more particularly to such user interfaces that are flexible and hierarchical, and defined using a data definition language.

BACKGROUND OF THE INVENTION

Graphical user interfaces have become a mainstay with computers. They allow users an easier manner by which to use computers, as opposed to command-line interfaces that preceded them. A user typically uses a pointing device such as a mouse or a touch pad to navigate windows on a desktop, and is able to click on and select buttons and other components of the interface using the buttons of the pointing device. With the advent of computerized devices such as wireless phones, personal digital assistant (PDA) devices, etc., user interfaces have begun to be increasingly utilized with these devices as well.

A difficulty arises, however, in the manner by which a user interface is defined for computers and computerized devices. Typically, the user interface is hard coded into the operating system of a computer, hard coded into the application software, or is part of the firmware of a computerized device. This makes customization and changing of the user interface very difficult. For example, third parties that wish to customize a given basic interface for their own purposes typically have to recode one or more parts of the interface as defined in the operating system of a computer, hard coded into the application software, or the firmware of a computerized device. This is difficult to do, and makes for an expensive process, both with respect to time and money, in order to provide a customized interface.

For this and other reasons, therefore, there is a need for the present invention.

SUMMARY OF THE INVENTION

The invention provides for a flexible and hierarchical user interface for a computerized device, such as a computer, defined using a data definition language, such as the eXtensible Markup Language (XML). In one embodiment, such an interface is defined by at least one file in the data definition language. A base file defines a basic look and behavior of the interface. The file also includes data, such as multimedia data, for access via the interface. One or more extension files each modifies the basic look and behavior of the interface as initially defined by the base file. Each of these files may also include data for access thereof via the interface. In one particular embodiment, the interface includes a number of components organized into a number of layers. Each layer is such that it has a view state that is changeably selectable between visible and hidden.

Thus, in varying embodiments of the invention, a user interface is flexibly defined on-the-fly using the data definition language. For example, a file defining an interface can be received over a network, such as the Internet, to a computer or a computerized device, such that it is then rendered on the computer or the device. This means that new applications that may require a new user interface can easily be added to a computerized device or a computer via the receipt of a new file. Furthermore, new user interfaces are more easily developed by programmers by using the data definition language.

Furthermore, in varying embodiments of the invention, a user interface is hierarchical. While the base file defines the basic look and behavior of the interface, subsequent files can modify the interface to override and/or extend the interface as originally defined by the base file. This means that an interface is easily customizable for a particular sponsor or other party. For example, an interface for playing back audio data may have a given basic look and behavior, but can be modified by extension files to customize the basic look and behavior for a particular record label promoting their artists' music. Functionality can be added to the interface by the extension files, too.

Complexity of a user interface can be alternatively hidden and exposed in varying embodiments of the invention by using layers. For example, a basic user interface may have defined a play and stop button for multimedia data, which corresponds to the typical functionality that will be used by most users. However, other users may wish to fast-forward and rewind within the multimedia data, as well as pause within the data. Therefore, the addition of a "more" button, for example, within the interface can be such that when selected, it exposes another layer of components of the interface, such as fast-forward, rewind, and pause buttons.

Varying embodiments of the invention also provide for the inclusion of data embedded within the file for access thereof via the interface defined within the file itself. This means that a user does not have to download two separate files, one for the data to be accessed, and another for the interface through which the data is to be accessed.

Rather, a user only has to download one file, which contains both the definition of the interface, as well as data for access therethrough. Thus, a musical artist can generate files that include a customizable user interface for playing back their music, as well as the music itself Thus, where the data is branded—that is, where it is related to a particular band, a particular artist, a particular recording company, etc.—the interface that is defined in one embodiment of the invention can be related to the branded data. For example, in one embodiment, when a song from a particular artist is being played, the interface is modified so that it is specific and/or particular to that artist. In other words, the interface can be in varying embodiments of the invention such that its look and behavior is related to and/or specific to the data that is currently being access via the interface. This allows for customizable branded interfaces.

The invention includes computer-implemented methods, machine-readable media, computerized devices and systems, and computers of varying scopes. Other aspects, embodiments and advantages of the invention, beyond those described here, will become apparent by reading the detailed description and with reference to the drawings.

DETAILED DESCRIPTION OF THE INVENTION

Figure 1:
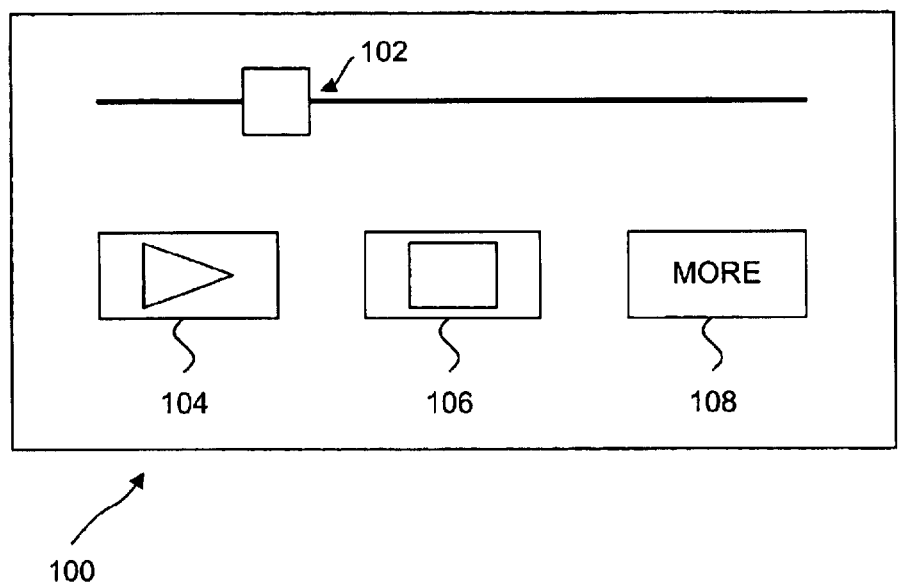
FIGS. 1–3 are diagrams of example and representative user interfaces according to varying embodiments of the invention.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims. Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Example and Representative Hierarchical User Interfaces With Layers

In this section of the detailed description, example and representative hierarchical user interfaces that have layers, according to varying embodiments of the invention, are presented. The user interfaces described in this section are for purposes of illustration and explanation only. That is, embodiments of the invention are not limited to the user interfaces described in this section.

Referring first to FIG. 1, a diagram of a user interface according to an embodiment of the invention is shown. The user interface 100 has components 102, 104, 106 and 108. Component 102 is a slider control that has a slider tab thereon. Component 104 is a play button, and component 106 is a stop button. Component 108 is a button labeled "more". The user interface 100 can be used in accordance with data that is audio in nature. For example, a user may download a file that includes the definition of the user interface 100, as well as audio data inclusive of a song by an artist or a band. The user's computer or computerized device renders the interface 100, and then displays it to the user. The user is then able to play the song by actuating component 104, stop the song by actuating component 106, and move to different parts of the song by moving the slider tab within the slider control of component 102, where the length of the control corresponds to the length of the song.

The user interface 100 itself, as shown in FIG. 1, has a faceplate made up of the components 102, 104, 106 and 108. The faceplate is what is shown on the display of the computer or computerized device. More particularly, the components 102, 104, 106 and 108 make up a first layer of the user interface 100; a second layer will be described in a successive paragraph. Each of the components has a type, an image associated with one or more states of the component, a location, and an action. For example, the component 102 is of a button type, and may have two images associated therewith: a first image when the button has not been selected—that is, when the audio data is not playing—and a second image when the button has been selected—that is, when the audio data is playing. The location of the component 102 specifies the location within the user interface, as shown in FIG. 1. Furthermore, the action associated with the component 102 indicates the action that occurs when the component 102 is actuated—for example, the action associated with the component 102 in particular is the play functionality, to play the audio data. The action can be a standard action defined within the base file, or a custom action defined within the extension files, in one embodiment.

The invention is not particularly limited to a given type of components, states for those components, or actions for those components. Other types of components include sliders, radio buttons, and check boxes, as can be appreciated by those of ordinary skill within the art. A given component may have one or more states, such that it may have an image corresponding to each of these states. Besides actuated and not actuated, other states include low, medium and high, etc. The actions for the components may correspond to any functionality, to which the invention is not particularly limited.

Figure 2:
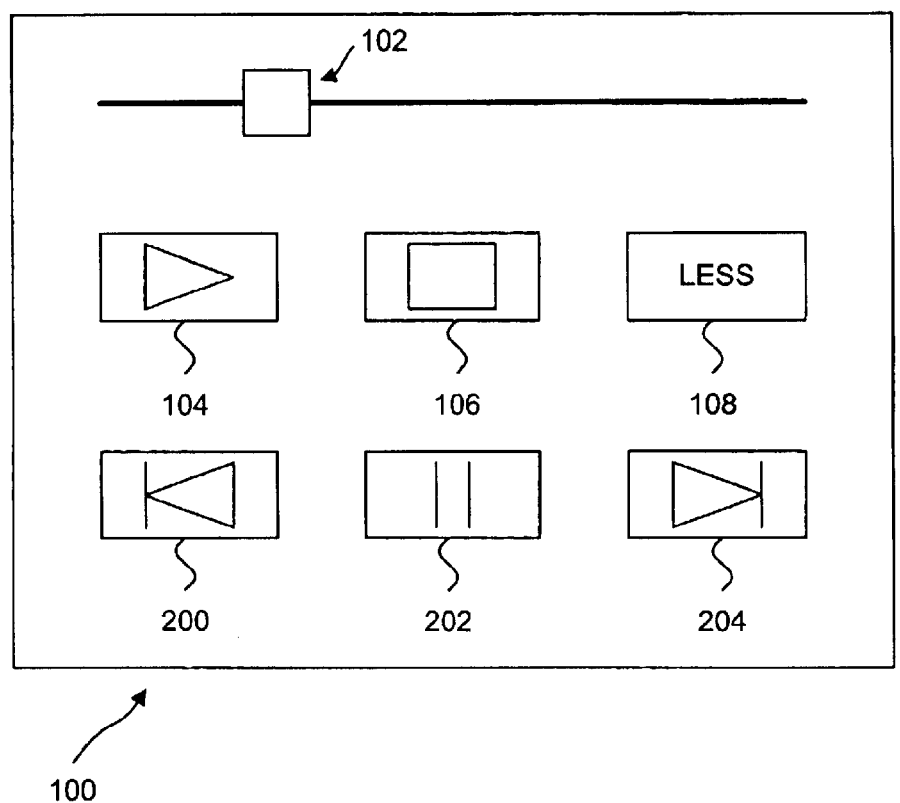

The component 108, which is the more button, is such that when it is selected, another layer of components is made visible. This is shown in FIG. 2, where the user interface 100 has the already described components 102, 104, 106 and 108, as well as the components now made visible, 200, 202 and 204. Thus, the component 108 has two states: a first state where the components 200, 202 and 204 are not visible, such that the component 108 is not actuated and its corresponding image displays the word "more"; and a second state where the components 200, 202 and 204 are visible, such that the component 108 is actuated and its corresponding image displays the word "less".

The components 200, 202 and 204 are part of a second layer, which has a view state that is changeably selectable between visible and hidden by the actuation of the component 108. That is, when the component 108 has been selected, then the layer of these components is made visible. When the component 108 has been unselected, then the layer of these component is made hidden again. The components 200, 202 and 204 have the actions associated therewith of: rewind, pause, fast-forward, respectively. These components may be desired to be initially hidden, for example, so as not to overwhelm the user with a number of different buttons in the interface. When the user desires to use them, he or she only needs to select the component 108 in order to display them.

Figure 3:
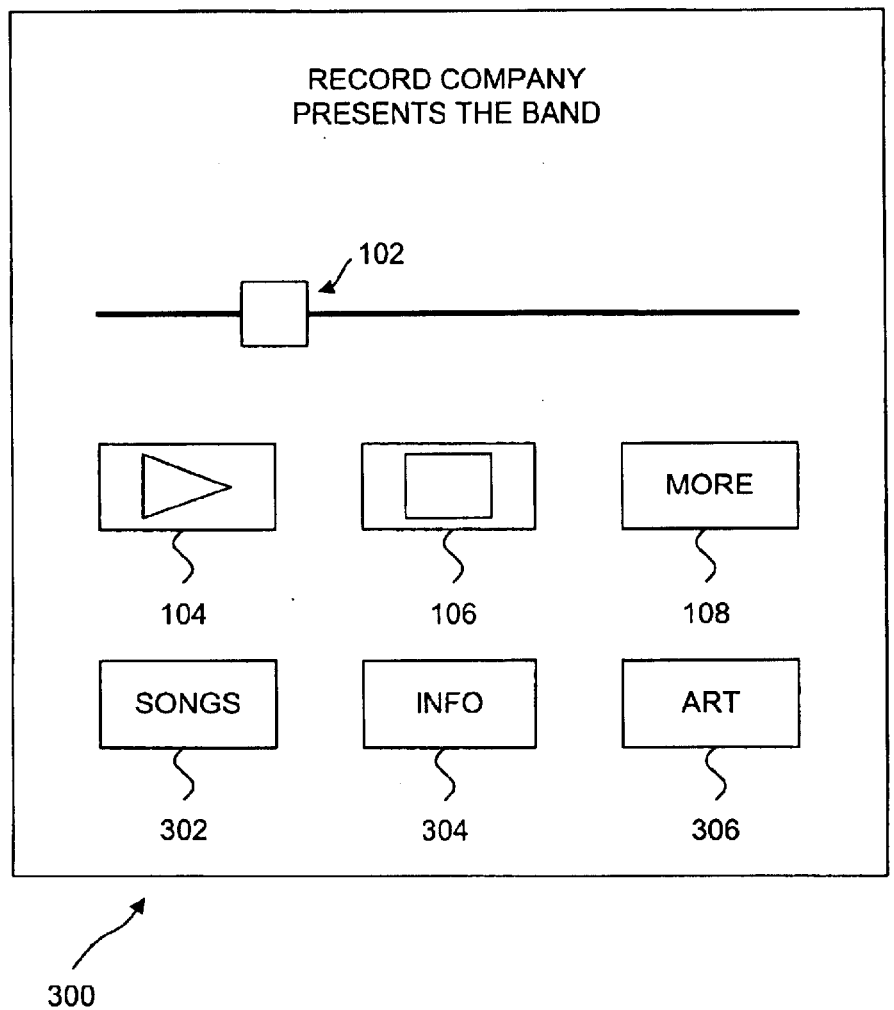

The user interface 100 as shown in FIGS. 1 and 2 thus is a user interface that has a faceplate, and two layers of components. The faceplate that is shown may particularly correspond to a given platform, such as a desktop computer platform that has a relatively large amount of screen real estate. The user interface as defined, however, may have additional faceplates, for other platforms. For example, a palm-top computerized device, or a handheld-type computerized device, typically has less screen real estate, such that the faceplate for it may be much smaller, so that all the controls are visible on the display at one time. In other words, a user interface can have more than one faceplate defined therein, such that a given faceplate is displayed when the user interface is rendered on a particular platform.

Where the user interface 100 of FIGS. 1 and 2 is defined by a file in a data definition language, as will be described in more detail in a further section of the detailed description, it can also be modified—that is, extended and/or overridden—by other files also in the data definition language. This allows for customization of the basic user interface 100 for particular purposes—for example, when a particular record label ships the user interface along with the music of its artists and bands. This is shown in more detail in the diagram of FIG. 3. The user interface 300 has the basic look and behavior of the user interface 100—for example, it has components 102, 104, 106 and 108, that function as has been previously described However, the user interface 300 also has the additional components 302, 304 and 306, which represent additional functionality by which the file defining the user interface 300 has extended the user interface 100. Thus, the component 302 is a songs button that when actuated may display the songs that can be played; the component 304 is an info button that when actuated may display information about the artist or band; and, the component 306 is an art button that when actuated may show a list of images of the artist or band that can be downloaded or viewed—for example, the album cover artwork, pictures of the band, etc. The user interface 300 also includes the text "Record Company Presents The Band," as an additional customization to the basic user interface 100.

Therefore, customization of the user interface 100 can be accomplished without having to rewrite the entire interface 100. Rather, only those parts that differ from the basic user interface 100 need to be included in a separate file, as will be described in more detail in a further section of the detailed description. Thus, the components 302, 304 and 306 only need to be defined, instead of having to redefine the components 102, 104, 106 and 108 as well. This is what is meant by a user interface that is hierarchical—a first level of the hierarchy defines the basic user interface 100, while subsequent levels of the hierarchy can define user interfaces based on the basic user interface 100, such as the user interface 300.

Figure 4:
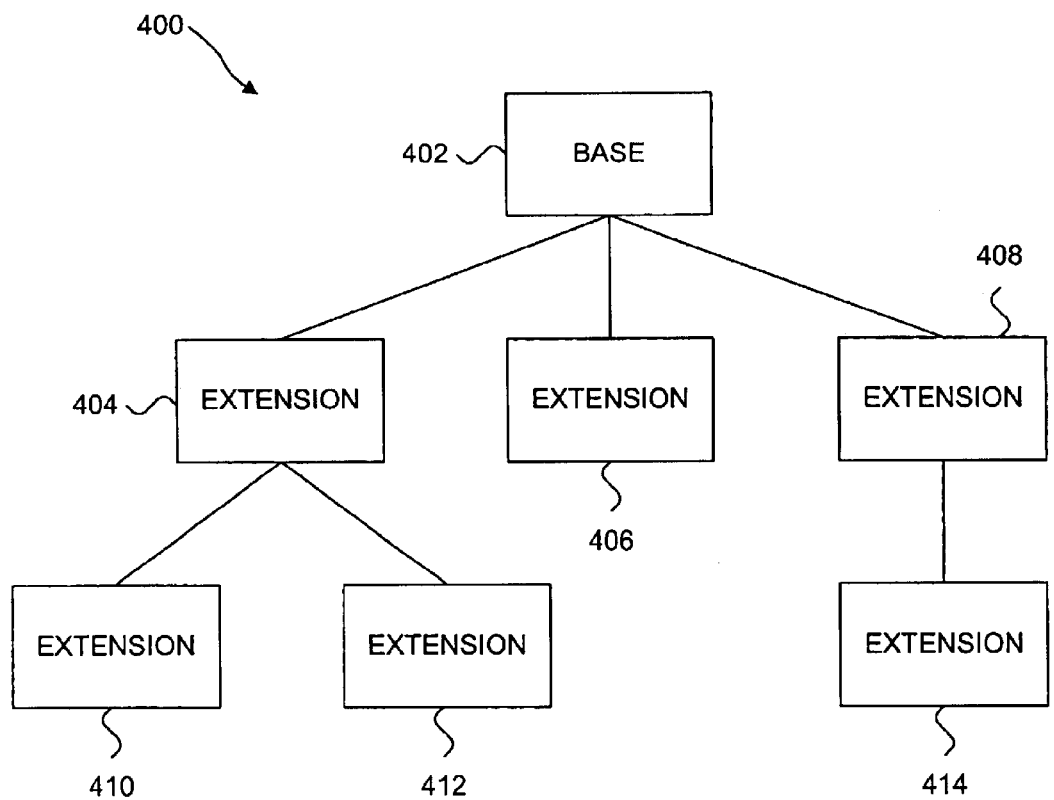
FIG. 4 is a diagram of a hierarchy of user interfaces, according to an embodiment of the invention.

A representative hierarchy of user interfaces is more specifically shown in the diagram of FIG. 4. The hierarchy 400 includes a base first level user interface 402, that can be defined, for example, in a first file. Each of the second level user interfaces 404, 406 and 408 can be defined in other files, such that each modifies the basic look and behavior of the first level user interface 402. Thus, this means that the base first level user interface 402 is able to be extended and/or overridden in more than one way. Furthermore, this process does not necessarily end at two levels of user interfaces. For example, as shown in FIG. 4, the user interface 404 is further modified by the third level interfaces 410 and 412, and the user interface 408 is further modified by the third level interface 414, where each of the third level interfaces 410, 412 and 414 is defined in still other files. As those of ordinary skill within the art can appreciate, however, the invention is not particularly limited to a given number of user interfaces nor a given number of levels of user interfaces; the diagram of FIG. 4 is for illustrative and example purposes only.

Files Including Data and Defining an Interface Using a Data Definition Language

In this section of the detailed description, the manner by which user interfaces are defined via files in a data definition language is presented. In one embodiment, the data definition language used is extensible Markup Language (XML), as known within the art, and as specifically described in the reference T. Bray, et al., extensible Markup Language, W3C Recommendation REC-xml-19980210, Feb. 10, 1998. While the examples described in this section are in XML, the invention is not so limited to XML, and can be implemented using other data definition languages as well.

In one embodiment, a file includes data, such as but not limited to audio data, video data, image data, and text data, for access thereof via the interface, also defined within the file in the data definition language. That is, the data is internally stored within the file. However, n one embodiment, a pointer to the data as it is stored externally, such as on an Internet web site, is instead inserted in lieu of the data itself; for example, a pointer can include a Uniform Resource Locator (URL) address that specifies where the data is stored on an Internet web site. That is, a reference to externally stored data is within the file. In another embodiment, a combination of data and pointers to other data is stored in the file. For example, one song of a band may be stored within the file itself, while another song may be referred to by a pointer.

The file defines the look and behavior of the interface, where the interface can include in one embodiment a number of components organized into layers, and a number of faceplates of layers of components, as has been described in the preceding section of the detailed description. In one embodiment, each layer has a view state that is changeably selectable between visible and hidden, as has been described, and each faceplate corresponds to a platform form factor on which the user interface is to be utilized. The invention is also not limited to a particular type of interface that is defined. For example, a multimedia interface can be defined for the playback of multimedia data such as one or more of audio, video, and image data; a gaming interface can be defined for computerized devices such as computers and gaming consoles, and other special-purpose gaming devices; an embedded systems interface can be defined for items that have computerized functionality added thereto, such as kitchen appliances, wireless phones, gas pumps, etc.

In one embodiment, each file is referred to as a package. The package includes the definition of the interface in the data definition language, as well as data for access thereof by the interface, or pointers to such data, as has been described. In one embodiment, where XML is the data definition language, the package is divided into a table of contents section and a faceplates section. The table of contents section lists and thus defines the locations and other information for all the images used by the interface. For example,

```
<toc>
    <section offset="&00000000"    size="&00000000"    id="demo-bg.bmp"/>
    <section offset="&00000000"    size="&00000000"    id="mmp-banner.bmp"/>
    <section offset="&00000000"    size="&00000000"    id="mmp-header.bmp"/>
    <section offset="&00000000"    size="&00000000"    id="picture-default.bmp"/>
</toc>
```

In this example, the <toc> and </toc> tags demarcate the beginning and end of the table of contents section. Four particular images are defined in this example: demo-bg.bmp, mmp-banner.bmp, mmp-header.bmp, and picture-default.bmp. Each of these has a section offset, and a size, expressed in hexadecimal notation. In this example, the identifications, or id's, of the images are also the names of the files containing the images. Thus, demo-bg.bmp identifies this image, and also is the name of the file in which the image is stored, in bitmap (.bmp) format. In other embodiments, the images can be specified by their location on an Internet web site, for example, via a Uniform Resource Locator (URL) address.

The faceplates section defines one or more faceplates, each corresponding to a different form factor of a version of the interface, for use, for example, on a different computerized device. Each faceplate also defines one or more components for use within that faceplate. For example,

```
<faceplate id="mmp-basic" screen-size="240x320"
    width="240" height="320" max-width="240" max-height="320">
    <visible-layer id="free"/>
    <image id="default"/>
    <faceplate id="Plain"/>
    <color id="foreground" value="&000000"/>
    <color id="background" value="&00DDFF"/>
    <image id="background" path="demo-bg.bmp"/>
    <component id="free:show-options" type="button"
        left="2" top="35" width="57" height="34">
        <content>Show</content>
        <action on="button-release" do="set-layers">-; +buy</action>
        <image id="default" path="button-off.bmp" transparent/>
        <image id="pressed" path="button-on.bmp" transparent/>
    </component>
</faceplate>
```

In this example, the tags <faceplate . . . > and </faceplate> denote the beginning and end of a faceplate. A component is further denoted between <Component . . . > and </component>. For the faceplate particularly, an id for the faceplate, and the screen size of the form factor of the device on which the interface is to be displayed, are specified in the line <faceplate id="mmp-basic" screen-size="240x320". The starting width and height of the faceplate, in pixels, is specified in the next line, along with a maximum width and height that the faceplate can be maximized to.

Next, a default visible layer is specified, in this case, "free". The component defined in the example above has the id "free:show-options", and is of the button type. Its location is specified relative to the upper left-hand corner of the faceplate itself, in pixels, as being two pixels from the left, and thirty-five pixels from the top. Its width and height are also specified, in pixels. The label of the button as shown on the user interface is specified by the <content> tag, "Show". Two images are specified for the button as well, a first when the button is not pressed, and a second when the button is pressed. Each of these buttons is also specified as transparent. Finally, the component has an action that is instituted on the event "button-release," that is, when the button has been pressed and then subsequently released by the user—for example, by the user using a pointing device to position a pointer over the button, and then clicking and releasing a pointing device button while the pointer is so positioned. The action that is performed is the "set-layers" action, followed by the parameter "+buy," which in this embodiment indicates that the components of the "buy" layer are to be shown (indicated by the plus sign).

Thus, each component has a unique identification, a type, an action, and one or more associated images corresponding to different states of the component. The invention is not particularly limited to a given type or types that components can be, nor specific actions that can be instituted as a result of component actuation, nor specific images nor number of images (i.e., number of states) for components. That is, the example described is for illustrative and representative purposes only, and does not represent a limitation of the invention itself.

Furthermore, the files in one embodiment are stored in one embodiment on a machine-readable medium. Such media include compact flash memory, floppy disks, CD-ROM's, etc. In another embodiment, the files are received from over a network, such as the Internet. The invention is not particularly limited to either approach, however, as can be appreciated by those of ordinary skill within the art.

Representative Computer or Other Such Device

In this section of the detailed description, a representative computer or other such device in conjunction with which embodiments of the invention may be practiced is described. However, the invention is not limited to the representative computer or other such device described herein. The phrase "other such device" is used to reflect the fact that devices other than computers can be used in accordance with embodiments of the invention—for example, wireless phones, embedded systems, PDA devices and MP3 devices, as have been listed in a preceding section of the detailed description, although the invention is not limited to an other such device particularly recited herein. As used in the claims, however, the phrase computerized device is inclusive of a computer, too.

Figure 5:
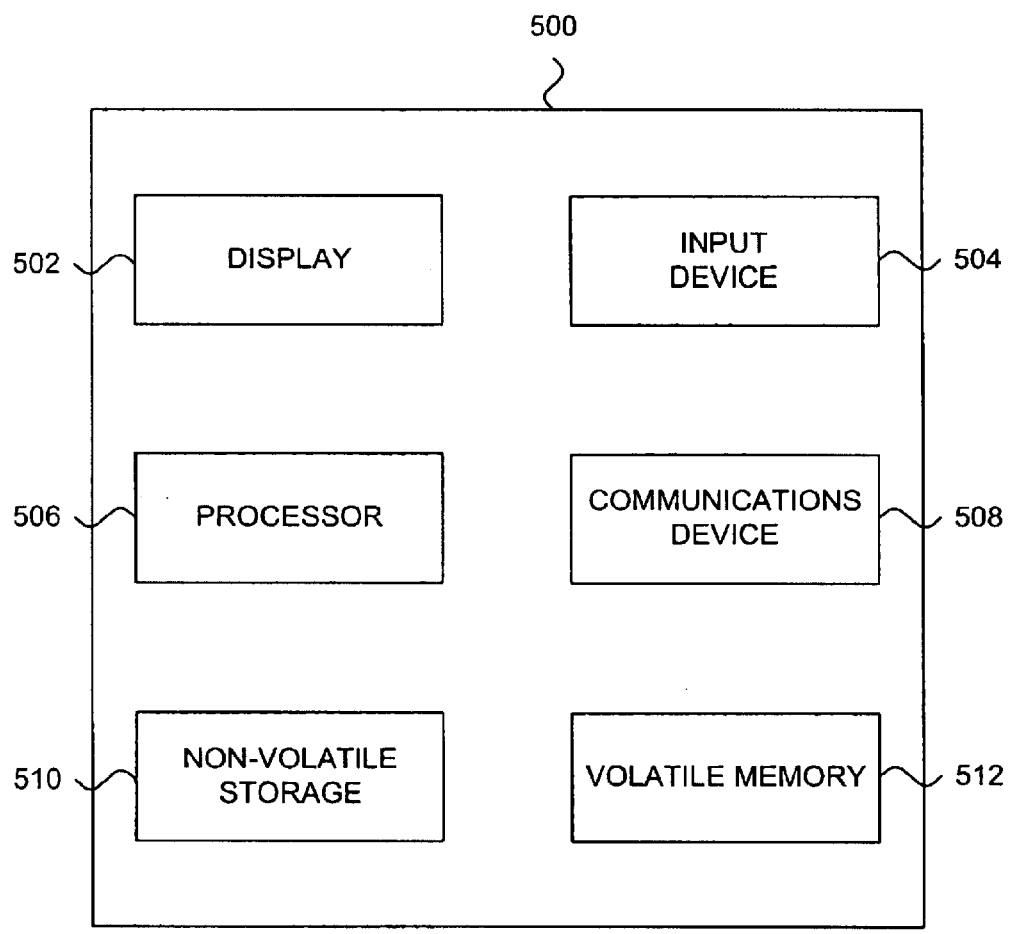
FIG. 5 is a block diagram of a representative computer or other computerized device in conjunction with which embodiments of the invention may be practiced; and, FIG. 6 is a flowchart of a method according to an embodiment of the invention.

The computer or other such device is shown in block diagram form in FIG. 5. The computer or other such device 500 desirably includes one or more of desirably but not necessarily each of the following components. The display 502 can include a flat-panel display, such as a liquid crystal display (LCD), or a cathode-ray tube (CRT) display. The input device 504 can include a keyboard, a pointing device such as a mouse, trackball or touch pad, a touch screen, one or more buttons, etc. The processor 506 executes instructions implementing methods of varying embodiments of the invention. The communications device 508 can be used to communicate with another computer or other such device— to communicate with a client, for example, in the case of a server, and vice-versa. The device 508 may be a network adapter, a modem, a wireless transceiver, etc. The non-volatile storage 510 can include a hard disk drive, and/or non-volatile memory such as flash and compact flash memory, such as in the form of memory cards. The volatile memory 512 typically includes a version of dynamic random-access memory (DRAM), as known within the art.

In one embodiment, the computer or other such device 500 has a user interface displayed on the display 502, such as a user interface as has been described in preceding sections of the detailed description. A computer program may also be included within the computer or other such device 500, executed from a computer-readable medium such as the storage 510 and/or the memory 512, by the processor 506. The program is designed to render the user interface hierarchically from a number of files that define the user interface in a data definition language, as has been described in preceding sections of the detailed description. Thus, a first file can define a basic user interface, and the remaining files can extend and/or override the basic user interface as defined by the first file. The files may also include data for access via the user interface, or pointers to such data.

Method

In this section of the detailed description, a method according to an embodiment of the invention are described. In one embodiment, the method is computer-implemented. Furthermore, the method can be realized at least in part as one or more programs, or parts thereof, each having a number of instructions, running on a computer or other such device—that is, as a program executed from a machine- or a computer-readable medium such as a memory by a processor of a computer or other such device. The programs are desirably storable on a machine-readable medium such as a compact flash memory, floppy disk or a CD-ROM, for distribution and installation and execution on another computer.

Figure 6:
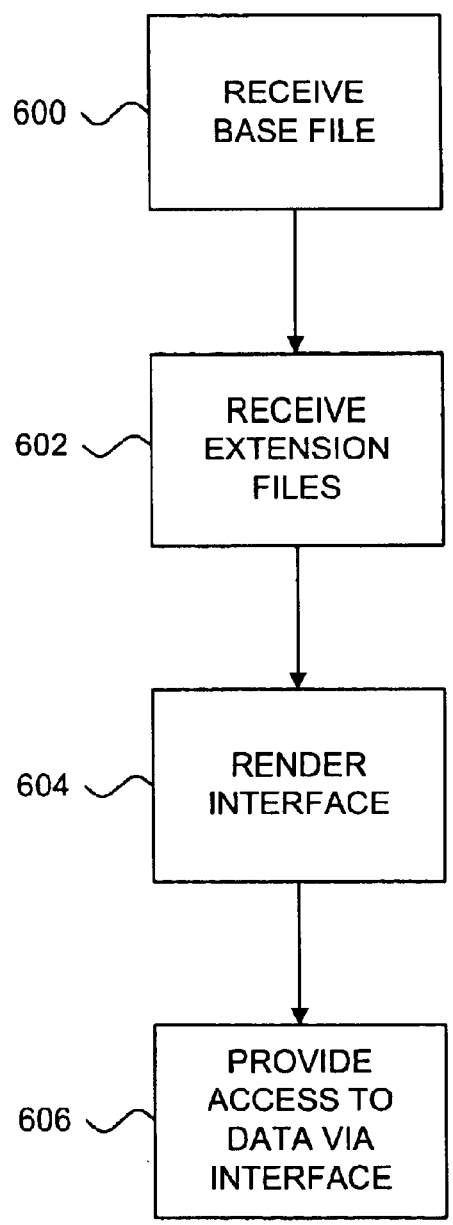

Referring to FIG. 6, a flowchart of a method according to an embodiment of the invention is shown. In 600, a base file is received that defines a user interface in a data definition language. The file can be received, for example, over a network, such as one or more of the Internet, an intranet, an extranet, a local-area network (LAN), and a wide-area network (WAN). The data definition language in one embodiment is XML, although the invention is not so limited. The user interface can be defined as described in preceding sections of the detailed description.

In 602, one or more extension files are then received, that modify the user interface as defined in the base file received in 600. The modifications are also in accordance with the data definition language. The modifications can override and/or extend the user interface as defined in the base file, as described in preceding sections of the detailed description.

In 604, the user interface, as defined by the base file and as modified by the extension file or files, is rendered on a display of a computer or a computerized device. Thus, this embodiment of the invention provides for a flexible user interface in that it is defined by a first file, and such that it can be modified by subsequent files. Furthermore, the interface is hierarchical, in that the subsequent files define interfaces based on the interface defined by the first file. Furthermore, the user interface is rendered on-the-fly—that is, once it is rendered, it can be re-rendered as necessary as new extension files are received.

Finally, in 606, user access is provided to data via the user interface that has been rendered. The data can be stored within one of the files (either the base file or the extension file or files), can be referred to by a pointer within one of the files, or either or both. The type of the data is not limited by the invention. In one embodiment, the data can be one or more of audio data, video data, image data, and text data. The type of the interface itself is also not restricted by the invention. In one embodiment, the interface can be a multimedia interface, a gaming interface, an embedded systems interface, etc.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A flexible and hierarchical-user interface for a computerized device defined by a plurality of files in a data definition language, the files comprising:

a base file at a base level of a hierarchy defining a basic look and behavior of the user interface and including internally stored data and externally referenced data, the internally stored data and the externally referenced data being accessible via the user interface the internally stored data residing within the base file, and the externally referenced data residing external to the base file; and at least one extension file at a lower level of the hierarchy to extend the base file and providing a flexible interface property and a hierarchical interface property to the user interface, wherein the at least one extension file modifies the basic look and behavior of the user interface as defined by the base file, wherein the flexible interface property enables on-the-fly modification and the hierarchical interface property enables modification via at least one of the base file and one other such extension file at a next level in the hierarchy.

2. The interface of claim 1, wherein at least one of the extension files comprises data for access via the interface.

3. The interface of claim 1, wherein the data comprises at least one of: audio data, video data, image data, and text data.

4. The interface of claim 1, wherein the data definition language comprises eXtensible Markup Language (XML).

5. The interface of claim 1, wherein the flexible and hierarchical user interface comprises an interface selected from the group comprising: a multimedia interface; a gaming interface; and an embedded systems interface.

6. A computerized device comprising:

a display;

a user interface displayed on the display; and, a computer program designed to render the user interface flexibly and hierarchically from a plurality of files defining the user interface in a data definition language, the files comprising a base file at a base level of a hierarchy to define a basic user interface and at least one extension file at a lower level of the hierarchy to at least one of extend and override the base file to modify the basic user interface and providing a flexible interface property and a hierarchical interface property, the base file comprises internally stored data and externally referenced data for access via the user interface, the internally stored data residing within the base file, and the externally referenced data residing external to the base file, wherein the flexible interface property enables on-the-fly modification and the hierarchical interface property enables modification via at least one of the base file and one other such extension file at a next level in the hierarchy.

7. The device of claim 6, further comprising:

a processor; and, a computer-readable medium, wherein the computer program is executed from the medium by the processor.

8. The device of claim 7, wherein the data comprises at least one of: audio data, video data, image data, and text data.

9. The device of claim 6, wherein the data definition language comprises eXtensible Markup Language (XML).

10. The device of claim 6, wherein the flexible and hierarchical user interface comprises an interface selected from the group comprising: a multimedia interface; a gaming interface; and an embedded systems interface.

11. A computer-implemented method comprising:

receiving a base file at a base level of a hierarchy and including internally stored data and externally referenced data defining a user interface in a data definition language;

receiving at least one extension file at a lower level of the hierarchy to extend the base file provided with a flexible interface property and a hierarchical interface property to the user interface to modify the user interface in the data definition language, wherein the flexible interface property enables on-the-fly modification and the hierarchical interface property enables modification via at least one of the base file and one other such extension file at a next level in the hierarchy;

providing access to data stored in at least one of the base file and the at least one extension file via the user interface as rendered; and rendering the user interface as defined by the base file and as modified by the at least one extension file.

12. The method of claim 11, wherein the data comprises at least one of: audio data, video data, image data, and data.

13. The method of claim 11, wherein the data definition language comprises eXtensible Markup Language (XML).

14. The method of claim 11, wherein the flexible and hierarchical user interface comprises an interface selected from the group comprising: a multimedia interface; a gaming interface; and an embedded systems interface.

15. A flexible and hierarchical user interface for a computerized device defined by at least one file in a data definition language, the at least one file comprising a file comprising:

branded data for access via the interface; and data defining a look and behavior of the interface, such that the look and behavior is related to the branded data, the data providing a flexible interface property and a hierarchical property to the user interface, wherein the flexible interface property enables on-the-fly modification and the hierarchical interface property enables modification via the data.

16. The method of claim 15, wherein the data comprises at least one of: audio data, video data, image data, and text data.

17. The method of claim 15, wherein the data definition language comprises eXtensible Markup Language (XML).

18. The method of claim 15, wherein the flexible and hierarchical user interface comprises an interface selected from the group comprising: a multimedia interface; a gaming interface; and an embedded systems interface.

19. A flexible and hierarchical user interface for a computerized device defined by at least one file in a data definition language, the at least one file comprising a file defining a look and behavior of the interface and including internally stored data and externally referenced data for access via the interface, such that the look and behavior of the interface is specific to data currently being accessed thereby, the data providing a flexible interface property and a hierarchical property to the user interface, wherein the flexible interface property enables on-the-fly modification and the hierarchical interface property enables modification via the data.

20. The interface of claim 19, wherein the data comprises at least one of: audio data, video data, image data, and text data.

21. The interface of claim 19, wherein the data definition language comprises eXtensible Markup Language (XML).

22. The interface of claim 19, wherein the flexible and hierarchical user interface comprises an interface selected from the group comprising: a multimedia interface; a gaming interface; and an embedded systems interface.

* * * * *